Jan. 3, 1950  W. RABE  2,493,313
INDICATOR
Filed May 29, 1944
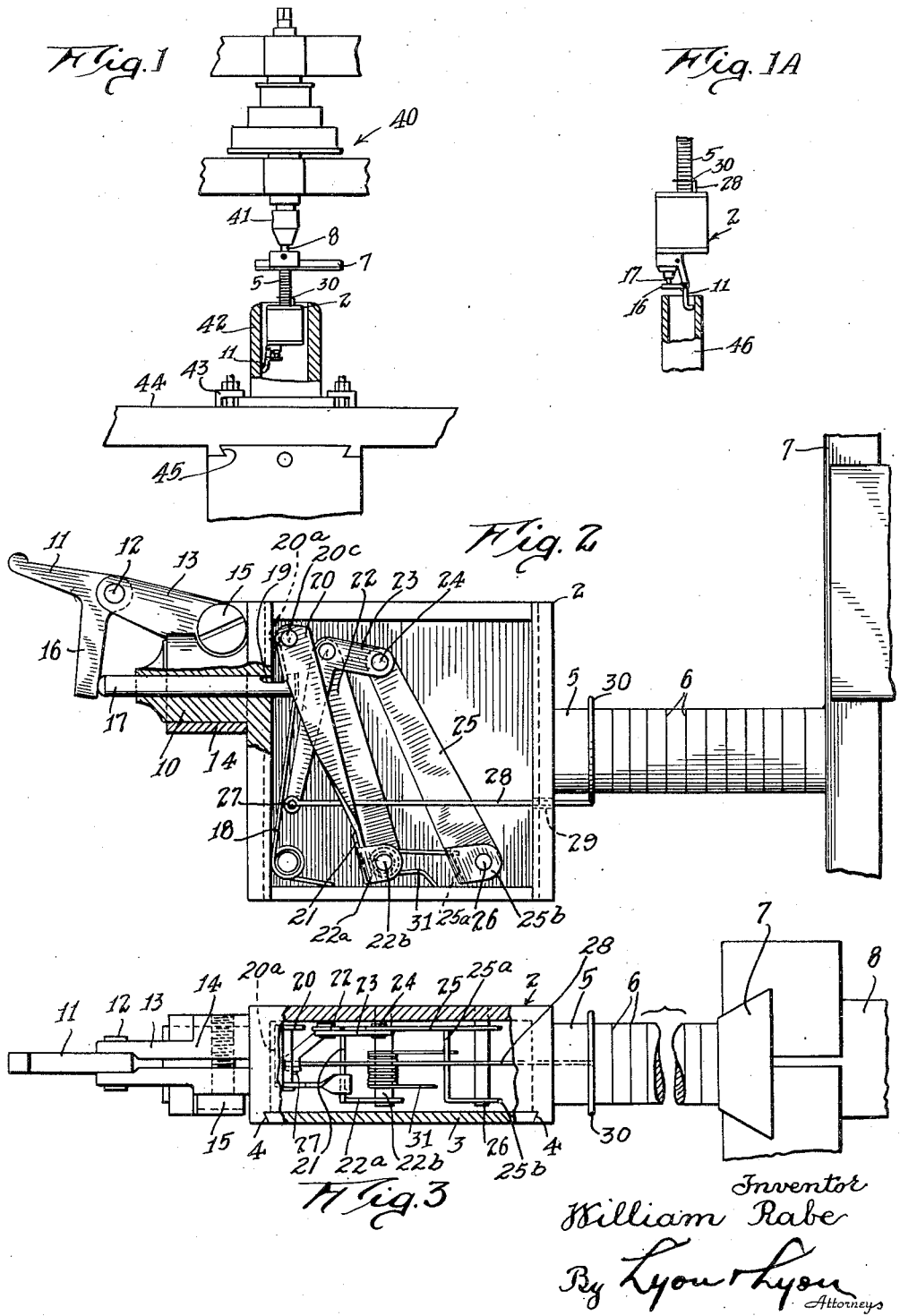
Inventor
William Rabe
By Lyon & Lyon
Attorneys Patented Jan. 3, 1950

2,493,313

UNITED STATES PATENT OFFICE 2,493,313

INDICATOR

William Rabe, Los Angeles, Calif.

Application May 29, 1944, Serial No. 537,932

7 Claims. (Cl. 33—172)

This invention relates to an indicator for use in connection with metal working machines to effect a centering operation with respect to the bore of a workpiece being operated upon, or to determine the correct position for performing the milling operation upon the piece of work.

An object of the present invention is to provide an indicator for indicating the exact center of a bore in cutting a workpiece, which indicator can be read in any of the rotary positions of the indicator.

Various indicators have been devised for locating the center of a bore. To locate the center of a bore, such devices are provided with contacts for contacting the bore, the center of which is to be located, together with some mechanism leading to a gauge for indicating the radial movement of said contacts when the device is rotated. When the indicator is on the true center of the bore being measured, the measurements are constant during revolution of the device. As previously constructed, many gauges have been difficult to read during their rotation, and other gauges which have been designed to be easily read from all sides, have the disadvantage that the indicator offers too much resistance to movement of the contacts, with the result that the device is not practical or accurate.

In the indicator of the present invention there is provided an indicating ring movable over graduations in such manner that the position of the indicator is easily read in all relative rotary positions of the device. Such an indicator is mounted on a multiplying leverage so designed as to provide a substantially parallel point of support and movement for the indicator. In this way the necessity for including in the device any guide bearings, motion reversing means, or similar devices in connection with the movement of the indicator, is avoided with the result that a more sensitive and accurate indicator is provided.

A further object of the present invention is to provide an indicator in which the contact member is mounted in a position offset from the axis of the supporting member of the indicator so that the indicator can be used inside a long hole or on connection with a long pin or button. The indicator of the present invention can be used for indicating the center of either a very small hole or a very large hole in a workpiece.

Another object of the present invention is to provide an indicator in which there is provided means arranged to prevent damage to the multiplying mechanism of the indicator by an overmovement of the contact member.

The indicator of the present invention will be readily understood from the description of the preferred example of the invention, in connection with the accompanying drawings, in which Figure 1 is a diagrammatic drawing of the indicator installed in position for use in connection with the workpiece.

Figure 1A is a fragmentary view of the indicator in position for use in connection with a workpiece having a small bore.

Figure 2 is an enlarged side view with the cover removed, certain parts being in section.

Figure 3 is a view at right angles to Figure 2, certain parts being in section.

Referring to the drawings, the indicator of the present invention comprises a housing 2 in the form of a rectangular box having a cover 3 slidable in the groove 4 by which the cover may be removed to expose the multiplying mechanism of the unit. The housing 2 is provided with a shank 5 which has a plurality of graduations 6. The shank 5 is connected to a cross head 7 by means of which the indicator may be attached by a stud 8 to a milling machine head 40 so that the axis of the shank 5 may be offset with respect to the axis of the milling machine head to any desired degree. From the opposite side of the housing 2 there extends a hub 10.

The contact member 11 of the gauge is pivoted as indicated at 12 to an arm 13 depending from a split sleeve 14 indicated as enclosing the hub 10 and adapted to be tightened upon the hub 10 by a set-screw 15. The pivotal contact member 11 has an arm 16 adapted to engage the end of the rod 17 extending axially through the hub 10. Within the housing 2 the rod 17 engages an arm of the spring 18 which yieldingly urges the rod 17 into contact with the arm 16 of the contact member 11.

The rod 17 is provided with a groove 19 which forms a shoulder for contact between the rod 17 and a lever 20 pivoted at the upper end of the housing. The lever 20 has its main portion formed of flat metal with the lower end twisted as viewed in Fig. 2. Near the upper end the lever 20 has a lateral extension 20a which is bent back, as indicated at 20b, to provide two aligned spaced apart portions of the member 20 by which the same may be pivotally mounted. The righthand wall of the groove 19 of rod 17 (as viewed in Fig. 2) loosely contacts the lateral extension 20a of lever 20. The rod 17 contacts the lever 20 close to the pivot point thereof in order to provide suitable motion multiplying effect. The end of the lever 20 is in engagement with an extension 21 on a pivoted lever 22. The lever 22 is provided with an extension 21 and a return bend portion 22a so that there is provided spaced apart pivot points for the lever 22. The contact between lever 20 and lever 22 occurs between the lower end of lever 20 and the inner vertical wall of the extension 21 of the lever 22. The lever 22 is pivoted to the central pin of a crank 23. The crank 23 is in turn pivoted, as indicated at 24, to the end of the lever 25. The lever 25 at its lower end has the offset extension 25a with a return bend portion 25b so that there are provided two spaced apart pivot bearing points for the lever 25 about pin 26. The levers 20, 22 and 25 are pivoted to pins respectively mounted by the walls of the housing 2. Levers 22, 25, and the crank 23 constitute a substantially parallel multiplying linkage. The crank 23 has an arm extending to the lower end of the housing where it is pivoted as indicated at 27 to a wire or rod 28. The wire or rod 28 extends parallel to the shank 5 through an opening 29 in the housing 2 and terminates in a loop 30 surrounding the shank 5.

The loop 30 constitutes an indicating member of the device. Because of the multiplying type of leverage shown, the pivot point 27 moves substantially parallel to the axis of the shank 5. Thus no turning movement is imposed upon the indicator and the opening 29 in the housing does not necessarily contact the wire 28.

There is provided a spring 31 for yieldingly urging the multiplying linkage in the direction to advance the ring 30 to the right as viewed in Figure 2. This spring 31 is wound around the lower pivot pin of the lever 22 and has one end in sliding contact with the lower wall (as viewed in Figure 2) of the housing 2, and has its other end extending into an opening in the extension 25a of the lever 25. The tension of the spring 31 is such that it presses against this extension 25a in the direction urging the lever 25 clockwise as viewed in Figure 2.

In the use of the device of the present invention, it will be readily appreciated that the position of the ring 30 with respect to the graduations 6 is equally visible in all rotary positions of the device. The ring 30 for supporting movement in operation requires only a sliding contact with the shank 5 and the support on the points 27 which move substantially parallel to the axis of the shank 5. No bearings or motion reversing means are necessary in this indicator. The necessary large multiplication of the movement of the contact member 11 is therefore provided, while at the same time the multiplying mechanism, including its connection to the indicator, is low in friction and therefore accurate in operation.

The operation of the multiplying mechanism of the present invention is as follows: The spring 18 applies a pressure normally urging the rod 17 to the left, as viewed in Fig. 2, and therefore normally urging the free end of the contact member 11 into the most advanced radial position. Likewise the contact between the notch 19 of the rod 17 and the extension 20a of the lever 20 yieldingly urges the lever 20 clockwise. This motion is transmitted through the contact of the lower end of the lever 20 with the extension 21 to the lever 22. Lever 22 is thus urged to pivot counter-clockwise about its pivot pin 22b. Since the point of contact between rod 17 and lever 20 is much closer to the pivot pin 20c than the point of contact between lever 20 and the extension 21, a multiplying effect is obtained in proportion to these relative distances. The counter-clockwise motion imparted to lever 22 is likewise imparted through the short side of the crank 23 to lever 25 which is thus urged to rotate counter-clockwise about its pivot pin 26. The spring 31, pressing against the lever 25, has an opposite effect; that is to say, it urges the lever 25 in a clockwise direction but the force of spring 31 is overcome by the greater force of spring 18. The counter-clockwise movement of levers 22 and 25 carry with them the crank 23 which has a clockwise rotation about its pivot point and lever 22 so that its end 27 moves to the left as viewed in Fig. 2 and connecting ring 30 is therefore moved to the left. When, however, the free end of the contact member 11 moves radially inwardly in engaging operation, the rod 17 is forced to the right, as viewed in Fig. 2, against the spring 18, which allows spring 31 to rotate the lever 25 clockwise, carrying with it lever 22 in a clockwise direction and rotating lever 20 in a counter-clockwise direction until contact is re-established between the wall of notch 19 and extension 20a of lever 20. In this motion the free end 27 of the crank 23 moves to the right, as viewed in Fig. 2, its motion being large compared to the right-hand component of the motion of the pivot pins connecting the crank 23 with levers 22 and 25, respectively.

In Figure 1 one method of using the indicator is shown, in which 40 may represent any milling machine head having a chuck or collar 41 for mounting the indicator. The workpiece 42 is indicated as held by clamps 43 on a table 44 which may have cross grooves 45 and other cross grooves at right angles thereto (not shown). As shown in Figure 1 the contact member 11 has been rotated about the hub 10 in order that the contact member may extend beyond the housing of the indicator and in this position the housing of the indicator, as well as the contact point 11, may extend into the bore, the center of which is to be measured. As indicated in Figure 1A when operating upon a workpiece such as 46 having a small bore the contact member 11 is pivoted on the hub 10 to face toward the axis of the indicator, in which position very small diameters may be measured.

While the particular form of the invention herein described is well adapted to carry out the objects of the invention, various modifications and changes may be made, and this invention is of the scope set forth in the appended claims.

I claim:
1. An indicator for locating centers, which comprises a case, a motion multiplying mechanism including a pair of substantially parallel levers each having one end pivoted to said case at points spaced close together as compared with the length of said members, a crank, the other ends of said levers being pivoted at closely spaced points to said crank, a contact member for operating said multiplying leverage, a graduated member extending from said casing and an indicating member surrounding said graduated member and slidably supported thereby, said indicating member being also supported by said crank and movable thereby.

2. An indicator for locating the center of a workpiece, comprising a graduated shank, a crank, a motion multiplying leverage including said crank supported in a casing attached to said shank and including a pair of substantially parallel members each pivoted to said housing at one end and pivoted to a crank at its other end, said crank having an arm, an indicating member connected to said arm and enclosing said shank and movable thereover in indicating operations, means yieldingly urging the multiplying leverage into a retracted position, a pivotally mounted contact member, means connecting said contact member to said multiplying leverage including a loose connection to permit said contact member to move independent of said multiplying mechanism on imposition of shock thereto, said connecting means including spring means yieldingly urging the contact member to advance position in opposition to the means yieldingly urging the multiplying leverage to the indicating position.

3. An indicator for locating the center of a workpiece, which comprises a casing, a motion multipling mechanism within the casing including two substantially parallel members, each having one of its ends pivoted to the casing, a crank pivoted to the other end of one of said members, said crank having a short crank arm to which is pivoted one end of the second parallel member, said crank having a long arm, a ring-shaped indicating member connected to said long arm, a graduated member surrounded by said ring-shaped member and on which said ring-shaped member is slidably mounted, a pivotally mounted contact member, and means for connecting the contact member for operating the motion multiplying mechanism.

4. An indicator for locating the center of a workpiece, which comprises a casing, a motion multiplying mechanism within the casing, a graduated member, an indicator supported solely by said multiplying mechanism and said graduated member, said multiplying mechanism including a crank, two substantially parallel members each pivoted at one of its ends to the casing at points close together, and each pivoted at its other end to said crank at closely spaced apart points, the crank providing the connection between the indicator and the multiplying mechanism, and a pivotally mounted contact member for actuating said multiplying mechanism.

5. An indicator for locating the center of a workpiece, comprising a graduated member, a case, a motion multiplying mechanism mounted in said case, an indicating member attached to and actuated by said multiplying mechanism and surrounding said graduated member and slidably movable thereover, said motion multiplying mechanism including a crank, a pair of substantially parallel members each pivotally mounted by said case at points spaced rather closely together and each having its opposite end pivoted at points spaced close to said crank, said crank having an arm attached to said indicator, whereby the line of movement of the supporting point of the crank for said indicating member is substantially parallel with the axis of said graduated member, and a pivotally mounted contact member for actuating said multiplying member.

6. An indicator for locating the center of a workpiece, comprising a graduated member, a case, a motion multiplying mechanism within the case, an indicating member attached to and actuated by said multiplying mechanism and surrounding said graduated member and slidable thereover, said motion multiplying mechanism including a crank, a pair of substantially parallel members each pivoted to the case at points rather close together and each pivoted to a crank at points close together, said crank having an arm pivoted to said indicator, whereby the line of movement of the supporting point on said crank for said indicating member is substantially parallel to the axis of said graduated member, a pivotally mounted contact member for actuating said multiplying mechanism, and means for yieldingly urging the contact member to its outer position.

7. An indicator for locating the center of a workpiece, which comprises a pivotally mounted contact member, means yieldingly urging the member to an outer position, a case, a motion multiplying mechanism located within the case, means for yieldingly urging the mechanism to a retracted position, said mechanism including a crank, a pair of substantially parallel members each pivoted at one end to the case, said members being each pivoted at its other end to a crank, said crank including an arm, a graduated member, and an indicating member surrounding said graduated member and attached to said arm of said crank, the point of support of said indicator on said crank being movable in a direction substantially parallel to the axis of said graduated member.

WILLIAM RABE.

REFERENCES CITED

The following references are of record in the file of this patent:

UNITED STATES PATENTS

| Number | Name | Date |
| --- | --- | --- |
| 928,492 | Brink | July 20, 1909 |
| 1,352,855 | Way et al. | Sept. 18, 1920 |
| 1,487,119 | Newitt | Mar. 18, 1924 |
| 1,516,909 | Bath | Nov. 25, 1924 |
| 1,842,502 | Blomquist | Jan. 26, 1932 |
| 1,860,993 | Clarkson | May 31, 1932 |